(12) United States Patent
Olcott

(10) Patent No.: US 7,415,352 B2
(45) Date of Patent: Aug. 19, 2008

(54) DISPLAYING VEHICLE INFORMATION

(75) Inventor: Andrew Olcott, Newton, MA (US)

(73) Assignee: Bose Corporation, Framingham, MA (US)

( * ) Notice: Subject to any disclaimer, the term of this patent is extended or adjusted under 35 U.S.C. 154(b) by 181 days.

(21) Appl. No.: 11/134,562

(22) Filed: May 20, 2005

(65) Prior Publication Data

US 2006/0265126 A1 Nov. 23, 2006

(51) Int. Cl.
G01C 21/00 (2006.01)
(52) U.S. Cl. .................. 701/211; 701/200; 701/207; 715/862; 715/863; 715/864; 715/865; 715/851
(58) Field of Classification Search .................. 715/863, 715/851, 700, 702, 718, 862, 864, 865; 701/1, 701/36, 200, 210, 211
See application file for complete search history.

(56) References Cited

U.S. PATENT DOCUMENTS

| 5,450,075 | A |   | 9/1995 | Woddington |
| 5,594,469 | A |   | 1/1997 | Freeman et al. |
| 5,774,828 | A | * | 6/1998 | Brunts et al. ................. 701/210 |
| 5,777,603 | A |   | 7/1998 | Jaeger et al. |
| 5,844,500 | A |   | 12/1998 | Beuk et al. |
| 5,847,704 | A | * | 12/1998 | Hartman ..................... 715/764 |
| 5,923,267 | A |   | 7/1999 | Beuk et al. |
| 5,941,930 | A | * | 8/1999 | Morimoto et al. ........... 701/201 |
| 5,982,355 | A |   | 11/1999 | Jaeger et al. |
| 6,009,355 | A | * | 12/1999 | Obradovich et al. ............ 701/1 |
| 6,031,519 | A |   | 2/2000 | O'Brien |
| 6,154,201 | A |   | 11/2000 | Levin et al. |
| 6,182,010 | B1 | * | 1/2001 | Berstis ....................... 701/211 |
| 6,208,932 | B1 |   | 3/2001 | Ohmura et al. |
| 6,222,525 | B1 |   | 4/2001 | Armstrong |
| 6,225,980 | B1 |   | 5/2001 | Weiss et al. |
| 6,232,961 | B1 | * | 5/2001 | Kunimatsu et al. .......... 345/173 |
| 6,256,558 | B1 | * | 7/2001 | Sugiura et al. ................. 701/1 |
| 6,275,231 | B1 | * | 8/2001 | Obradovich ................ 345/156 |

(Continued)

FOREIGN PATENT DOCUMENTS

DE 44 12 859 11/1994

(Continued)

OTHER PUBLICATIONS

Ferguson, K., "Too Much Tech?", [online] The Washington Diplomat, [retrieved on 2003-05], Retrieved from the Internet: <URL:http://www.washdiplomat.com/03-05/A3_03_05.html>.

Healey, J., "BMW 7 Series Loses Gold on Technical Merit", [online] USA Today {retrieved on Mar. 07, 2002], Retrieved from the Internet: <URL: http://www.usatoday.com/money/perfi/columnist/healey/2003-03-08-bmw.htm>.

Hellwig, E., "2004 Audi A8 L - An Alternative Turned Tempting", [online] Edmunds.com, [retrieved on Jun. 30, 2003], Retrieved from the Internet: <URL: http://www.edmunds.com/insideline/do/Articles/articleId=100355?articleId=100355>.

(Continued)

Primary Examiner—Thomas G. Black
Assistant Examiner—Wae Lenny Louie
(74) Attorney, Agent, or Firm—Fish & Richardson P.C.

(57) ABSTRACT

An information display unit for an automobile includes a display screen and a user interface presented on the display screen that simultaneously presents at least two display elements each depicting information relating to a different subsystem of the automobile (e.g., a navigational subsystem and an audio subsystem). The user interface visually emphasizes one of display element relative to another other display element in response to a predetermined stimulus such as a user's hand actuating or coming near a radio control knob or an approaching turn recommended by a navigation system.

39 Claims, 6 Drawing Sheets

U.S. PATENT DOCUMENTS

| | | | |
|---|---|---|---|
| 6,297,810 B1 | 10/2001 | Anderson | |
| 6,498,628 B2 | 12/2002 | Iwamura | |
| 6,529,804 B1* | 3/2003 | Draggon et al. | 701/1 |
| 6,539,289 B2* | 3/2003 | Ogino et al. | 701/1 |
| 6,583,801 B2 | 6/2003 | Eastty et al. | |
| 6,650,345 B1 | 11/2003 | Saito et al. | |
| 6,711,474 B1* | 3/2004 | Treyz et al. | 701/1 |
| 6,768,868 B1 | 7/2004 | Schnell | |
| 6,803,905 B1 | 10/2004 | Capps et al. | |
| 6,842,677 B2* | 1/2005 | Pathare | 701/36 |
| 6,904,570 B2 | 6/2005 | Foote et al. | |
| 6,970,783 B2* | 11/2005 | Knockeart et al. | 701/201 |
| 6,975,932 B2* | 12/2005 | Obradovich | 701/96 |
| 6,988,246 B2* | 1/2006 | Kopitzke et al. | 715/810 |
| 7,007,417 B2 | 3/2006 | Segan et al. | |
| 7,043,699 B2* | 5/2006 | Obradovich | 715/790 |
| 7,126,583 B1* | 10/2006 | Breed | 345/158 |
| 7,187,368 B2 | 3/2007 | Rekimoto | |
| 7,218,312 B2 | 5/2007 | Takaku | |
| 2002/0003206 A1 | 1/2002 | Culver | |
| 2002/0054159 A1* | 5/2002 | Obradovich | 345/839 |
| 2002/0055811 A1* | 5/2002 | Obradovich | 701/23 |
| 2002/0101334 A1* | 8/2002 | Ueda | 340/425.5 |
| 2002/0154003 A1* | 10/2002 | Ueda | 340/425.5 |
| 2003/0023353 A1* | 1/2003 | Badarneh | 701/1 |
| 2003/0025676 A1 | 2/2003 | Cappendijk | |
| 2003/0043206 A1 | 3/2003 | Duarte | |
| 2003/0076301 A1 | 4/2003 | Tsuk et al. | |
| 2003/0095096 A1 | 5/2003 | Robbin et al. | |
| 2003/0210258 A1* | 11/2003 | Williams | 345/700 |
| 2004/0007450 A1 | 1/2004 | Kojima | |
| 2004/0036769 A1* | 2/2004 | Sadahiro | 348/148 |
| 2004/0085447 A1* | 5/2004 | Katta et al. | 348/143 |
| 2004/0148093 A1* | 7/2004 | Tanaka et al. | 701/200 |
| 2004/0203411 A1 | 10/2004 | Holz auf der Heide et al. | |
| 2005/0016824 A1* | 1/2005 | Olcott et al. | 200/329 |
| 2005/0018172 A1* | 1/2005 | Gelfond et al. | 356/51 |
| 2005/0030379 A1* | 2/2005 | Luskin et al. | 348/148 |
| 2005/0080528 A1* | 4/2005 | Obradovich | 701/36 |
| 2005/0115816 A1 | 6/2005 | Gelfond et al. | |
| 2005/0171690 A1* | 8/2005 | Brass et al. | 701/207 |
| 2006/0004517 A1* | 1/2006 | Hasegawa et al. | 701/211 |
| 2006/0074553 A1* | 4/2006 | Foo et al. | 701/212 |
| 2006/0082545 A1* | 4/2006 | Choquet et al. | 345/156 |
| 2006/0122742 A1* | 6/2006 | Hasegawa et al. | 701/1 |
| 2006/0161871 A1* | 7/2006 | Hotelling et al. | 715/863 |
| 2006/0195232 A1* | 8/2006 | Obradovich | 701/1 |
| 2007/0016370 A1 | 1/2007 | Kuenzner | |

FOREIGN PATENT DOCUMENTS

| | | |
|---|---|---|
| DE | 19936257 | 2/2001 |
| DE | 10107572 | 10/2002 |
| DE | 10121685 | 11/2002 |
| EP | 0 794 408 | 9/1997 |
| EP | 0901229 | 3/1999 |
| EP | 1 080 974 | 3/2001 |
| EP | 1 080 976 | 3/2001 |
| EP | 1168396 | 1/2002 |
| EP | 1228917 | 8/2002 |
| EP | 1241557 | 9/2002 |
| EP | 1293882 | 3/2003 |
| GB | 2126388 | 3/1984 |
| GB | 2382292 | 5/2003 |
| JP | 09147671 | 6/1997 |
| JP | 2003/043175 | 6/2003 |
| JP | 2003/151399 | 9/2003 |
| WO | WO 97/43749 | 11/1997 |
| WO | WO 01/71397 | 9/2001 |
| WO | WO 02/063601 | 8/2002 |
| WO | WO 03/023781 | 3/2003 |
| WO | WO 03/044646 | 5/2003 |
| WO | WO 2004/025834 | 3/2004 |
| WO | WO/2005/116801 | 12/2005 |

OTHER PUBLICATIONS

Hinckley et al., "Touch-Sensing Devices", ACMCHI'99 Conference on Human Factors in Computing Systems, pp. 223-230. (1999).

IBM Technical Disclosure Bulletin, "Personal Computer Environment Control via a Proximity Sensor," IBM Corp. New York USA, vol. 36, No. 8, Aug. 1993.

IBM Technical Disclosure Bulletin, "Touch Sensitive Overlay with Tactile Feedback," IBM Corp. New York USA, vol. 29, No. 2, Jul. 1986 (Jul. 1986), pp. 761-763.

Lee et al., "Production of Alkyl Ester as Biodiesel from Fractionated Lard and Restaurant Grease", J. Amer. Oil Chemist's Soc., v.79(2), pp. 191-195 (Feb. 2002).

Patten, J., "Audiopad", [online], [retrieved on Jun. 13, 2005] Retrieved from the Internet: <URL: URL: http://www.jamespatten.com/audiopad/>.

Patten, J., Portfolio vitae contact bio, [online] [retrieved on Jun. 13, 2005], Retrieved from the Internet: <URL: http://www.jamespatten.com>.

Quantum Research Group, Ltd., QT115 Qprox-TM 8-pin Sensor, Apr. 3, 2000.

Quantum Research Group, Ltd., QtIIX Variations, Aug. 3, 1999.

Sony Vaio C1VN Picture Book Specs; [online], [Retrieved on Sep. 28, 2000] Retrieved from the Internet: <URL: http://Transmetazone.com/articleview.cfm?articleid=381%page=>; pp. 1-4.

Tayman, J., "The $77,845 Computer (Luxury Sedan Included)", [online] Business 2.0, [retrieved on Sep. 01, 2002], Retrieved from the Internet: <URL: http://www.business2.com/b2/web/articles/0,17863,514977,00.html>.

Vishay Semiconductors, Application of Optical Reflex Sensors, Doc. #80107, Feb. 2000.

Vishay Semiconductors, Application of Optical Reflex Sensors, Doc. #80108, Dec. 3, 2003.

Vishay Semiconductors, Reflective Optical Sensors with Transistor Output, Doc. #83760, Mar. 7, 2000.

Vishay Semiconductors, Subminiature Reflective Optical Sensor with Phototransistor Output, Doc. #83778, Aug. 13, 2004.

International Search Report PCT/US2006/019194, dated Sep. 26, 2006.

EP Examination Report in Application No. 04103530.4, dated Apr. 23, 2007.

EP Search Report in Application No. 04103530.4, dated Apr. 19, 2006.

EP Search Report in Application No. 05102572.4, dated Jun. 30, 2006.

EP Partial Search Report in Application No. 04103530.4, dated Feb. 14, 2006.

EP Examination Report in Application No. 04103530.4, dated Sep. 24, 2007.

CN Office Action / Examination Report (Translation of Nov. 2, 2007 report) in Application No. 200510078338.X.

CN Office Action / Examination Report (Translation of Jun. 22, 2007 report) in Application No. 200410075792.5.

EP Examination Report in Application No. 05102572.4, dated Jun. 25, 2007.

EP Search Report in Application No. 05102572.4, dated May 18, 2006.

EP Examination Report in Application 04103530.4, dated Dec. 18, 2006.

EP Examination Report in Application No. 05102572.4, dated Feb. 20, 2007.

International Preliminary Report on Patentability in Application No. PCT/US2006/019194, dated Nov. 23, 2007.

Office Action in U.S. Appl. No. 10/626,349, dated Mar. 21, 2008.

* cited by examiner

DISPLAYING VEHICLE INFORMATION

TECHNICAL FIELD

This disclosure relates to presenting information about various vehicle subsystems, such as a navigational system and audio system, on a display screen.

BACKGROUND

Vehicles, such as automobiles, typically include an array of on-board subsystems, such as a navigation system, audio system, video system, beating and air conditioning system, rear-view camera system, fuel system, and others. One or more consoles, such as a radio console or a navigation console in a dashboard or other readily-accessible location, are typically included in the vehicle to provide a user with information about and/or control of various subsystem.

SUMMARY

In one aspect, the invention features an information display unit for a vehicle (e.g., automobile, aircraft, watercraft, etc.) that has a user interface which presents on a display screen two display elements relating to one or more subsystems of the vehicle (e.g., navigation system, audio system, video system, fuel system instrumentation system, etc.). The user interface is configured to visually emphasize one display element relative to another display element in response to a predetermined internal stimulus (e.g., an action or event triggered by one of the subsystems) or a predetermined external stimulus (e.g., an action taken by a user).

In another aspect, the invention features an information display unit for an automobile that includes a display screen and a user interface presented on the display screen that simultaneously presents at least two display elements each depicting information relating to a different subsystem of the automobile. The user interface is further configured to visually emphasize at least one display element relative to at least one other display element in response to a predetermined stimulus.

Implementations may include one or more of the following features. The display elements may depict information relating to a navigational system, audio system, heating and air conditioning system, instrumentation system, rear-view camera system, on-board telephone system, or other subsystems of the automobile. The display elements may be an output of a subsystem, such as a navigational map produced by a navigation system, or may summarize operation of a subsystem, such as a window summarizing operation of the audio or video system.

The user interface may visually emphasize a display element in response to an internal stimulus, such as a stimulus created by one of the subsystems). For example, a user interface may emphasize a display element depicting information relating to the navigational subsystem of the automobile in response to the automobile approaching a turning maneuver determined by the navigational subsystem. The user interface may also visually emphasize a display element in response to an external stimulus, such as user's hand or other object touching or proximate to a control element associated with a display element and the user interface. The information display unit may include one or more proximity sensors for detecting presence of an object near a control element. A display elements may be touch-sensitive and function as a control element.

The user interface of the information display unit may simultaneously present two display elements by overlaying one over another. For example, a first display element depicting a navigational map or an image produced by a rear-view camera may be shown on substantially the entire display screen while a second display element, such as a window summarizing operation of an audio or video system, is overlaid over the first display element.

The user interface may visually emphasize a display element by changing visual characteristics of the emphasized display element, changing visual characteristics of other display elements, or both. The user interface may change any number of visual characteristics of one or more display elements to emphasize a particular display elements, such as changing the size, position, color, transparency, or brightness of one or more display elements presented on the display.

In another aspect, the invention features an automobile that includes a plurality of subsystems (e.g., audio system, video system, HVAC system, instruments system, fuel system, navigation system, rear-view camera system, etc.) and an information display unit (e.g., mounted in a dashboard). The information display unit includes a display screen and a user interface presented on the display screen that simultaneously presents at least two display elements each depicting information relating to a different subsystem of the automobile. The user interface is configured to visually emphasize at least one display element relative to at least one other display element in response to a predetermined stimulus.

In another aspect, the invention features a method for displaying information about multiple subsystems of a vehicle that includes simultaneously presenting on an electronic display at least two display elements each depicting information relating to one or more subsystems of the vehicle and visually emphasizing at least one display element relative to at least one other display element in response to a predetermined stimulus.

Implementations may include one or more of the following features. The method may also include associating a display element with a control element, and the predetermined stimulus may be a user touching a control element associated with the display element. The method may also include detecting presence of an object near the control element associated with the display element, and the predetermined stimulus may be detection of an object near the control element associated with the display element.

The predetermined stimulus may be an external stimulus, such as a stimulus caused by a user's action, and/or an internal stimulus, such as an action or event in one of the subsystems.

A display element may be emphasized by changing visual characteristics of the emphasized display element and/or by changing visual characteristics of other display elements.

In another aspect, the invention features a software product residing on a medium bearing instructions to cause an instruction processor to simultaneously present on an electronic display at least two display elements each depicting information relating to a different subsystem of an automobile and visually emphasize at least one display element relative to at least one other display element in response to a predetermined stimulus.

Implementations may include one or more of the following features. The software product may have further instructions to cause the instruction processor to associate a display element with a control element, and a predetermined stimulus may be detection of an object touching the control element associated with the display element or detection of an object near the control element associated with the display element.

The predetermined stimulus may be caused by a user action or action or event in one of the subsystems.

Other features, as well as advantages and objects, are described in more detail below and in the accompanying figures and claims.

DETAILED DESCRIPTION

A vehicle, such as an automobile, may be provided with an information display unit that efficiently presents information about one or more of the vehicle's subsystems by visually emphasizing a display element that is likely to be of interest of a vehicle operator or other user. By visually emphasizing display elements that are likely to be of interest to an operator, the operator's attention will be quickly directed toward the emphasized display element and potentially lessen the amount of time the operator is distracted from operation of the vehicle.

Figure 1:
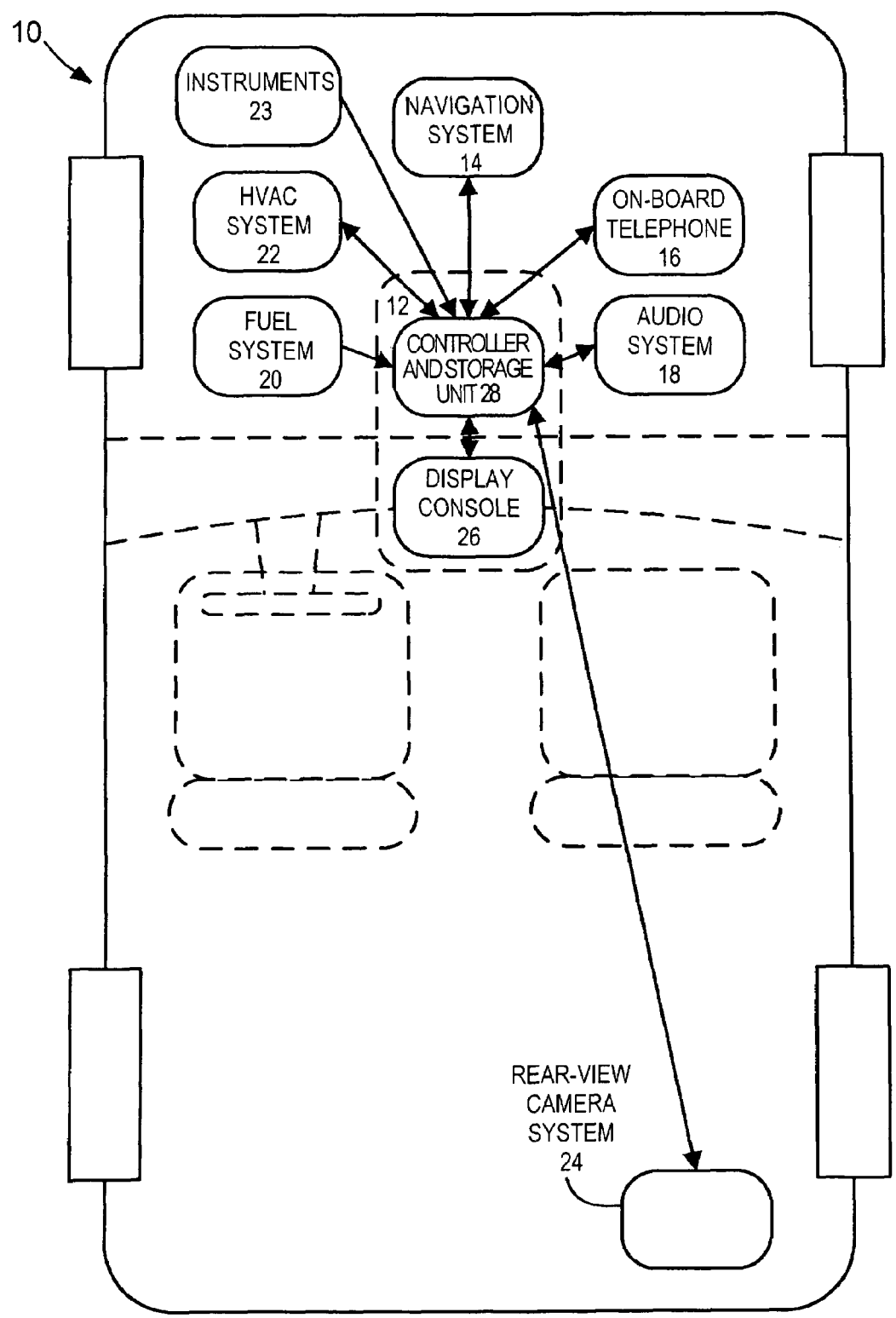
FIGS. 1-2 illustrate a vehicle information display unit integrated within an automobile.

For example, as shown in FIG. 1, an automobile 10 includes an information display unit 12 that is in communication with several on-board subsystems including a navigation system 14, an on-board telephone 16 (e.g., a cellular or satellite phone), an audio system 18, a fuel system 20, a heating and air conditioning (HVAC) system 22, an instruments system 23, and a rear-view camera system 24. Each of these subsystems provide information to the information display unit 12, which presents information about or controls for the subsystems via a user interface presented on a display console 26. The information display unit 12 is configured to output control signals to all of the subsystems, except the fuel and instruments subsystems. For these subsystems, the information display unit 12 only receives information, such as information about the fuel level or operation of the vehicle's instruments (e.g., speedometer, tachometer, odometer, turn signals, etc.).

The information display unit 12 includes a controller and storage unit 28 and display console 26. The storage unit stores software which is executed by the controller to present a graphical user interface on the display console 26.

Figure 2:
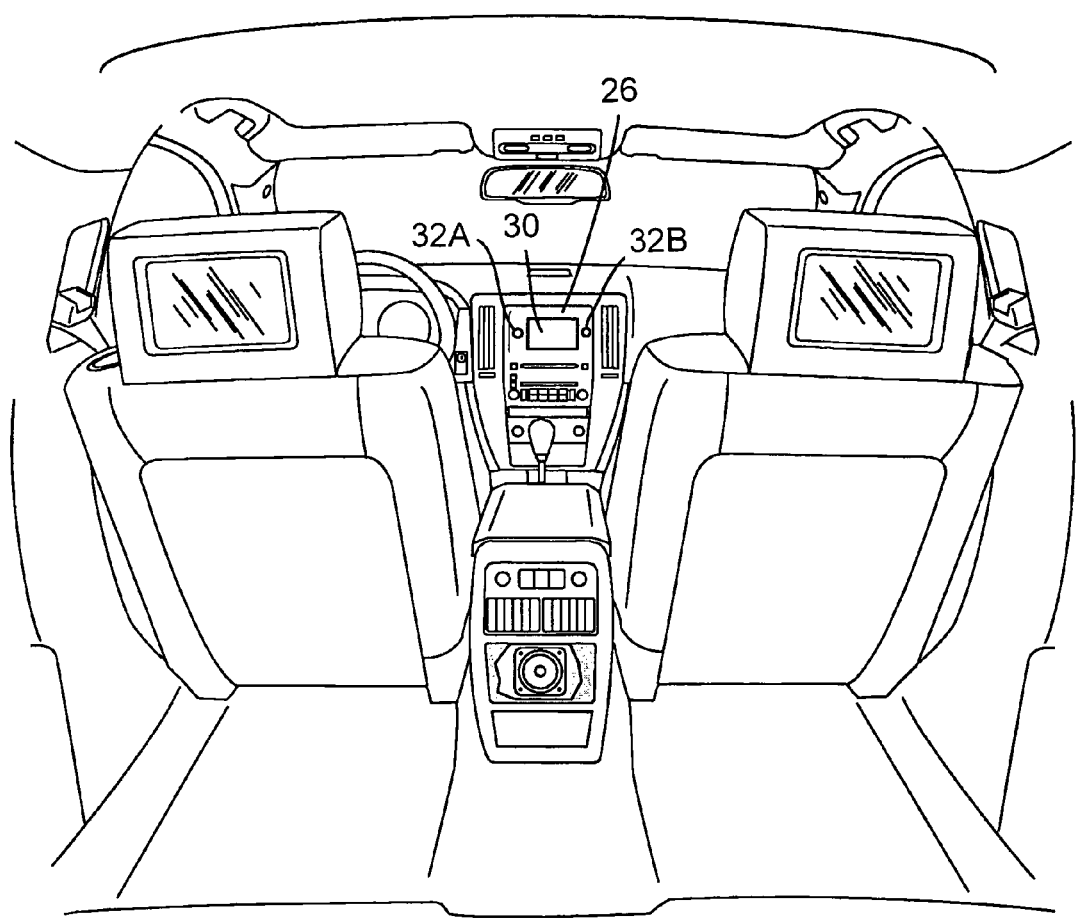

As shown in FIG. 2, the display console 26 includes a display screen 30 (e.g., a liquid crystal display, cathode ray tube, etc.) and control knobs 32a-32b. The display screen 30 displays a graphical user interface that is configured to simultaneously present multiple display elements, such as a subsystem information window (e.g., an information window relating to operation of an audio system) overlaid on a navigational map.

The control knobs 32a-32b are configured to control operation of various vehicle subsystems (e.g., audio, video, rear-camera, on-board telephone, navigation, HVAC, etc.), and may be in an active or inactive state. When a control element is in an active state, it is ready to accept an input from the user. In addition, a display element presented on the display screen may be associated with a control element. For example, a display element may be associated with an active control element such that when a user actuates the control element (e.g., rotates a control knob), the display element changes to inform the user of the corresponding action (e.g., volume of the audio system is increasing).

Figure 3A:
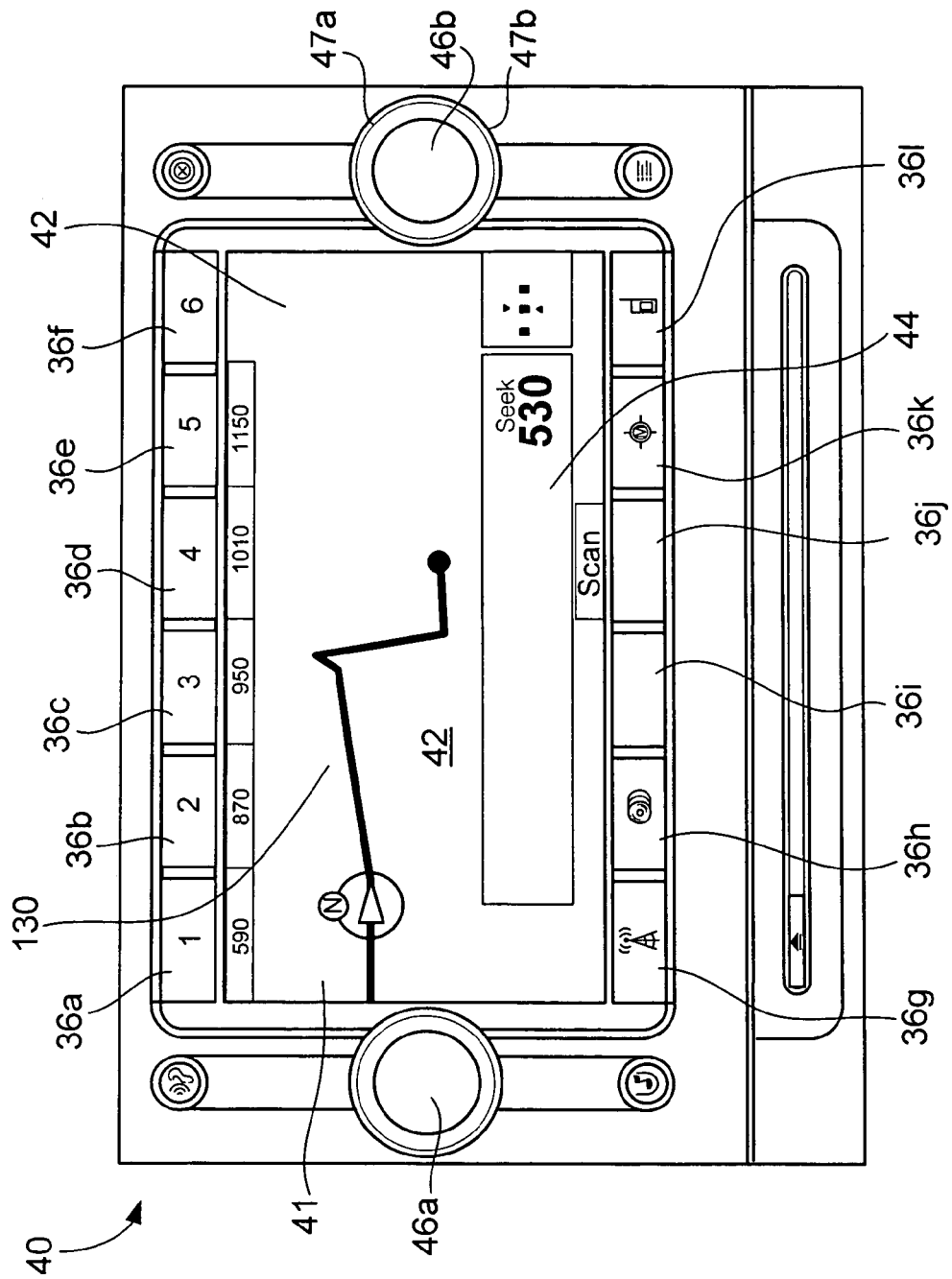
FIGS. 3A-3c and FIG. 4 illustrate a display console and user interface of a vehicle information display unit.
Figure 3B:
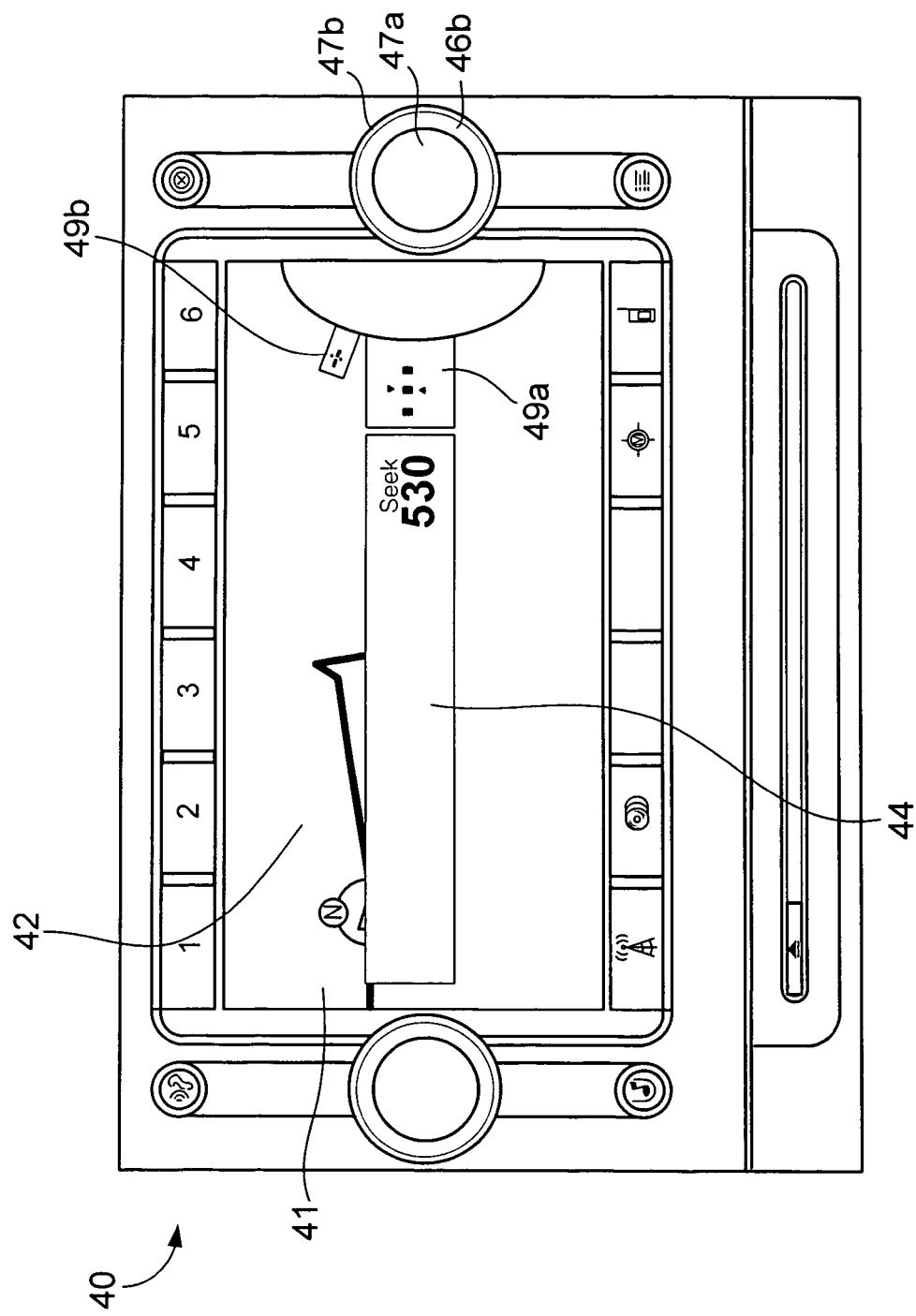
Figure 3C:
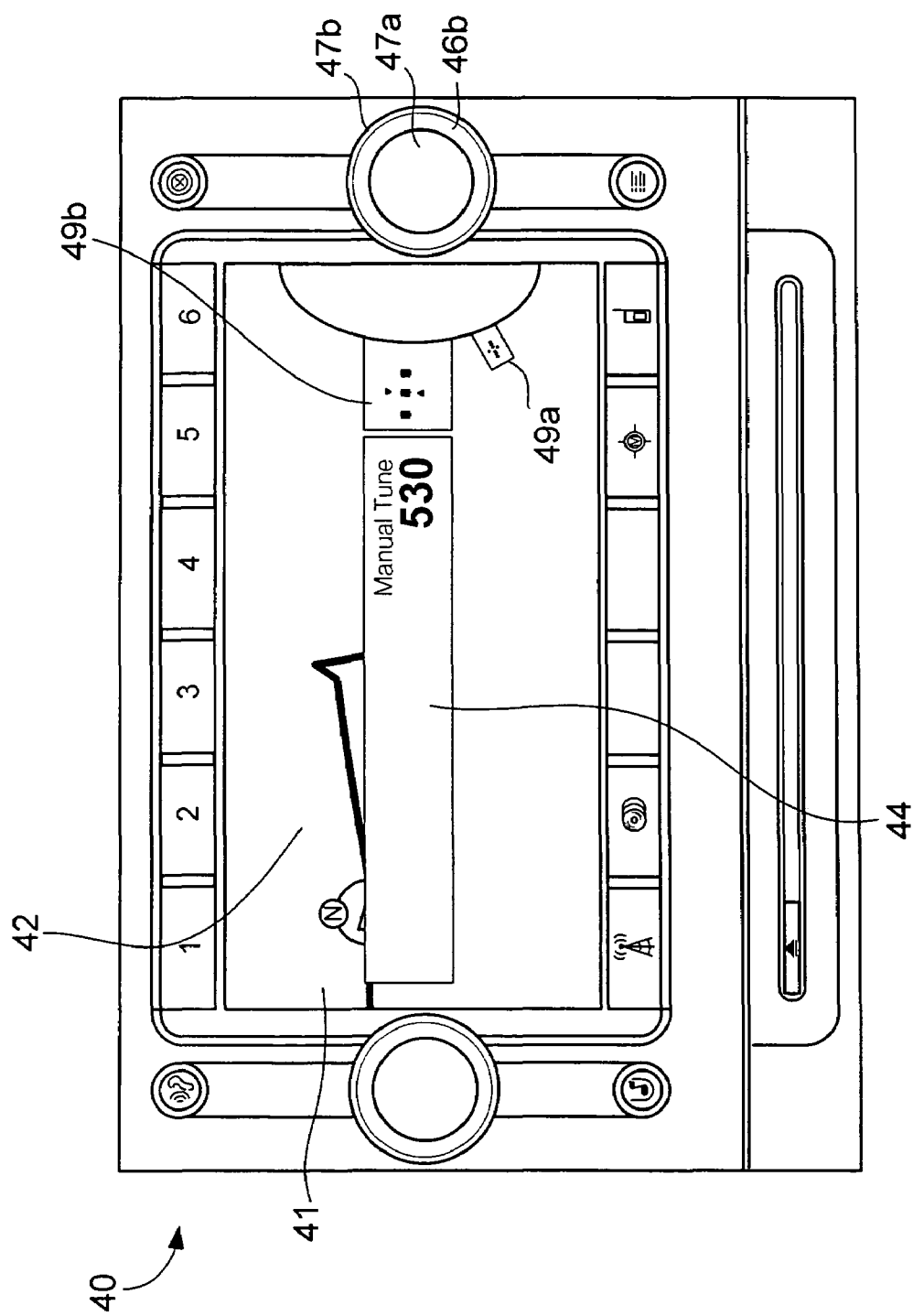

As shown in FIGS. 3A-3C, a display console 40 includes a display screen 41 that presents two display elements, a first display element 42 showing navigational map 42 and a second display element 44 summarizing the current mode of operation of the audio system (i.e., radio is tuned to AM 530 and is selected for seek control). In this example, the second display element 44 is overlaid on top of the first display element. In other implementations, the display elements may be cascaded or tiled.

Control knob 46b is ready to accept user input and is thus in an active state. Control knob 46b includes two concentric dials, an inner dial 47a and an outer dial 47b, that are each associated with the display element 44. The inner dial 47b is associated with the second display element 44 such that if a user were to turn the inner dial in one direction (e.g., clockwise) the second display element 44 would show the radio seek to the next receivable AM frequency after AM 530, and if a user were to turn the inner dial 47a in the other direction, the second display element 44 would show the radio would seek to the receivable AM frequency just before AM 530. The second display element 44 is also associated with the outer dial 47b of the control knob 46b such that if a user were to turn the outer dial 47b in one direction (e.g., counter-clockwise), the second display element would show operation of the inner dial 47a switch from seek control (shown in FIG. 3A-3B) to manual tune control (shown in FIG. 3C). Note that the second display element 44 includes two leaves 49a-49b that graphically summarize the mode of operation. In FIG. 3B, the lower leaf 49a is centered and enlarged indicating the seek control is selected, whereas in FIG. 3C, a user has turned the outer dial 47b in a counter-clockwise direction, causing the upper leaf 49b to be centered and enlarged indicating that manual tune control is selected.

In contrast to control knob 46b, control knob 46a is in an inactive state in the example shown in FIGS. 3A-3C. A control element may switch between active and inactive states based on internal or external input. For example, a user pressing a control knob may cause that knob to enter an active state and if the knob is not actuated (e.g., rotated) within a predetermined amount of time (e.g., 5 seconds) it may revert to an inactive state.

The display console also includes a proximity sensor (not shown) that senses when an object such as a user's hand is in close proximity to one of the control knobs located adjacent to the display screen 30. Example of proximity sensors that may be implemented in a display console are described in detail in U.S. patent application Ser. No. 10/956,836, titled "System and Method for Accepting A User Control Input" to Carl Price, Andrew Olcott, John Coffey, Neil Gelfond, Joe Killough, Peter Santoro, Lee Zamir, and James Hotary, filed Oct. 1, 2004, which is fully incorporated herein by reference. When the proximity sensor detects that an object is close to an active-state control element, the user interface visually emphasizes one display element presented on the display screen relative to other displayed elements. For example, referring to FIG. 3B, when an object such as a user's hand is close to knob 46b (which is in an active state), the user interface visually emphasizes the window 44 associated with the knob by moving window 44 to the middle of the display and extending its length across the entire width of the display. In addition to visually emphasizing window 44, the user interface also visually de-emphasizes the navigational map 32 by dimming it. By visually emphasizing a display element as a user reaches for a control element (e.g., a control knob) associated with that display element, the user's attention is quickly drawn to the emphasized display element and reduces the amount of time a user's attention is directed away from operating the vehicle.

When the user removes his or her hand away from the control knob, the user interface reverts to the configuration shown in FIG. 3A in which it simultaneously presents both display elements with roughly equal visual emphasis.

As shown in FIG. 3A, the display console 40 also includes several selection buttons 36a-36l, which provide additional subsystem controls for a user. Some of the selection buttons, i.e., 36g-36h and 36k-36l, are fixed-operation buttons that do not change operation based on which subsystem(s) are active. In the illustrated example, selection button 36g activates a radio source of the audio system, button 36h activates a compact disk player source of the audio system, button 36k activates the navigation subsystem, and button 36l activates the on-board telephone system. Other selection buttons are variable-operation buttons that change operation based on which subsystem(s) are being controlled by the information display unit. In the illustrated example, variable selection button control operation of the audio subsystem. In particular, buttons 36a-36e each correspond to a pre-set AM frequency and button 36j switches from the current seek mode to a scan mode. When a user selections on of the selection buttons, a visually emphasized display window is presented on the user interface. Thus, if a user selects the button associated with AM 870 (i.e., button 36b), a visually emphasized display window similar to display element 44 shown in FIG. 3B would appear indicating that the radio is tuning to frequency AM 870. Similarly, if the user selects the button associated with the CD source (i.e., button 36h), the display element summarizing operation of the radio source would be replaced by a visually-emphasized display element summarizing operation of CD source (e.g., title of CD and name of track being played).

While the example illustrated in FIGS. 3A-3C depict display elements relating to a navigational system and an audio system, the user interface is configured to depict display elements relating to each of the subsystems with which the information display unit is in communication. Thus, for example, the information display unit 12 shown in FIG. 1 includes display elements relating not only the audio system 18 and navigation system 14, but also the on-board telephone 16 (e.g., a cellular or satellite phone), an audio system 18, a fuel system 20, HVAC system 22, instruments system 23, and a rear-view camera system 24.

Visual emphasis of a display element may be changed in response to other internal or external stimuli in addition to the proximity of a user's hand to a control element or actuation of a selection button. For example, a display element may be emphasized when a user touches or actuates a control knob. Moreover, visual emphasis of a display element may be triggered by internal stimuli. For example, a display element of a navigational map (e.g., display element 44 shown in FIG. 3A) may be visually-emphasized when the vehicle is within a predetermined distance or time from its next maneuver. Similarly, a display element showing the output of a rear-view camera system may be visually emphasized on the display screen when an automobile is placed in reverse gear. Other examples of stimuli for triggering visual emphasis of a display element include an indication that the vehicle is low in fuel or oil, a key has been left in the ignition, the automatic transmission has been left in gear, the headlamps are on after the engine has stopped, the vehicle is overheating, a door is ajar, or a telephone call has been received.

Figure 4:
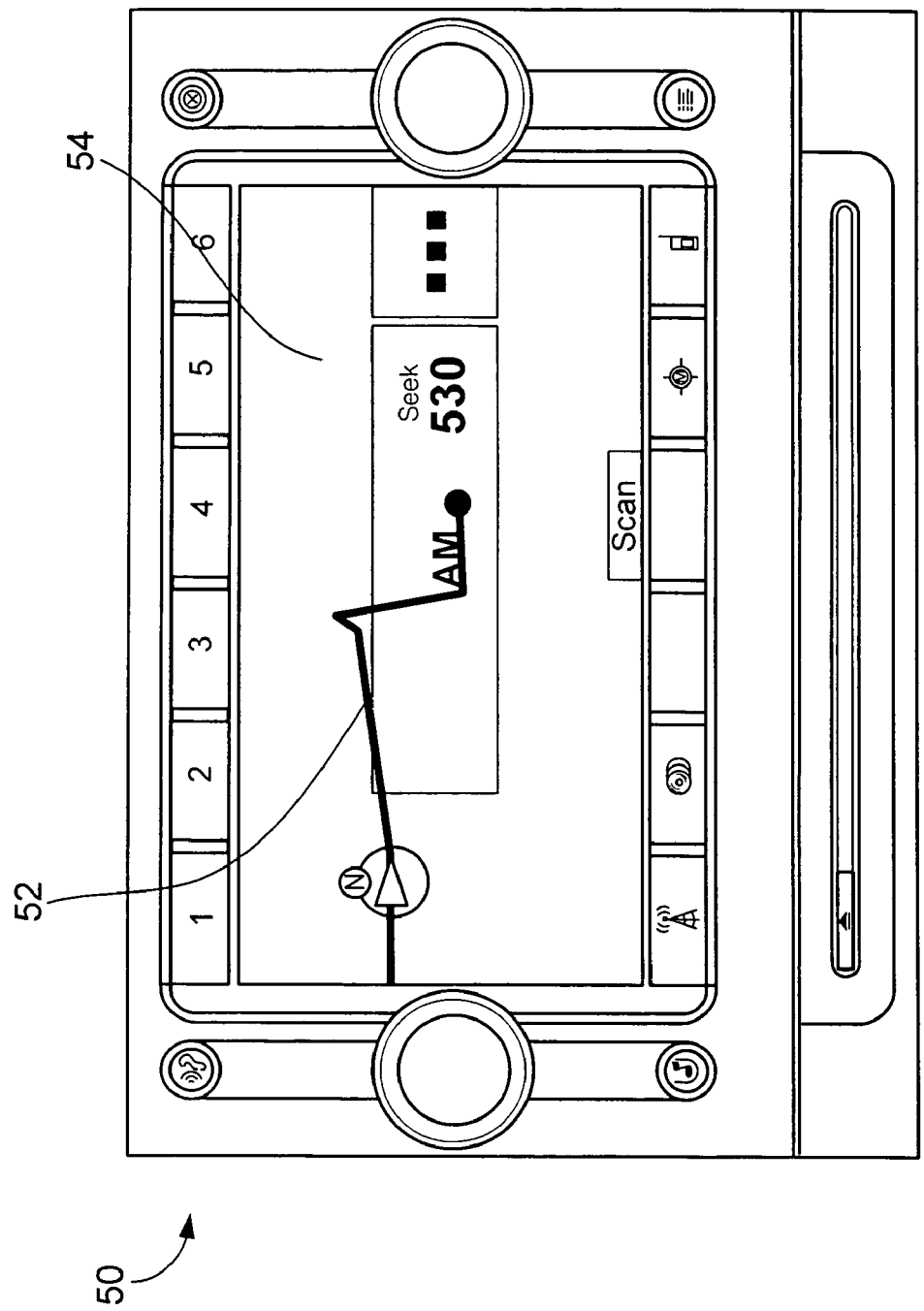

Visually emphasizing a display element involves changing visual characteristics of one or more display elements to draw a user's attention to the emphasized element. Thus, a display element may be visually emphasized by changing visual characteristics of that display element (e.g., increasing its brightness or size, changing its position on the display screen, causing it to blink, changing color to a bright color, changing the amount of information presented in the display element, making the display element opaque, etc.) and/or by changing visual characteristics of other display elements (e.g., decreasing brightness or size, changing position, changing color to a subdued color or to black and white, changing the amount of information in the display element, making the element transparent, etc.). Various combinations of these techniques can also be used to emphasize one display element relative to another. For example, referring again to FIG. 3A, when the vehicle approaches its next maneuver (a right turn), the first display element 42 that presents the navigational map may brighten and zoom in to show more detail. In addition, the second display element 44 that summarizes operation of the audio system may temporarily disappear or become subdued and transparent until the driver takes the turn. Similarly, as shown in FIG. 4, a display console 50 may visually emphasize one display element (i.e., element 52) by making another display element (i.e., element 54) transparent.

A number of embodiments of the invention have been described. Nevertheless, it will be understood that various modifications may be made without departing from the spirit and scope of the invention. For example, the display elements shown in FIG. 3A-3B provide information relating to the vehicle's navigation and audio subsystems, but do not provide a user-selectable control surface. In some implementations, however, one or more display elements may be a touch-sensitive control surface. Additionally, while FIG. 1 depicts direct communication between subsystems and the information display unit, in some implementations communication may occur over a network, such as a bus network. Additionally, in some implementations, one or more of the vehicle subsystems, such as an audio, video and/or navigation system, may be included within the information display unit as a single integrated system. And the vehicle information display unit may be located in any area for convenient viewing by user, such as in an instrument panel area of the vehicle. Moreover, a display screen and/or control elements that are part of an information display unit may be incorporated within a larger unit such as a vehicle head unit. Accordingly, other embodiments are within the scope of the following claims.

What is claimed is:

1. An information display unit for an automobile, the information display unit comprising:

a display screen;

a user interface presented on the display screen, the user interface including a first display element associated with a first subsystem of the automobile, and a second display element displayed concurrently with the first display element, the second display element being associated with a second system of the automobile, a control element configured to control operation of the second subsystem; and a proximity sensor configured to detect proximity of an object to the control element;

wherein the user interface is configured to respond to detection of an object's proximity to the control element by visually emphasizing the second display element.

2. The information display unit of claim 1, wherein at least one of the display elements depicts information relating to a navigational subsystem of the automobile.

3. The information display unit of claim 2, wherein the depicted information comprises a navigational map.

4. The information display unit of claim 3, wherein the display element comprising a navigational map is presented on substantially the entire display screen, and other display elements are overlaid on the navigational map.

5. The information display unit of claim 2, wherein at least one of the display elements depicts information relating to an audio subsystem of the automobile.

6. The information display unit of claim 2, wherein the user interface is configured to visually emphasize a display element depicting information relating to the navigational subsystem of the automobile in response to the automobile approaching a turning maneuver determined by the navigational subsystem.

7. The information display unit of claim 1, wherein at least one of the display elements depicts information relating to a heating and air conditioning subsystem of the automobile.

8. The information display unit of claim 1, wherein the control element comprises a knob.

9. The information display unit of claim 1, wherein the control element comprises a button.

10. The information display unit of claim 1, wherein the user interface is configured to visually emphasize the display element associated with the control element in response to a user touching the control element.

11. The information display unit of claim 1, wherein the user interface is further configured to visually de-emphasize the second display element in response to detecting withdrawal of the object from the proximity of the control element.

12. The information display unit of claim 1, wherein the user interface is configured to visually emphasize the second display element in response to detection of an object near the control element.

13. The information display unit of claim 1, wherein at least one of the display elements touch-sensitive.

14. The information display unit of claim 1, wherein the user interface is configured to visually emphasize the second display element by changing the amount of information shown on the second display element.

15. The information display unit of claim 1, wherein the subsystems of the automobile comprise one or more of the following: an audio system, a video system, a navigational system, a rear-view camera system, a fuel system, a telephone, and an instrumentation system.

16. The information display unit of claim 1, wherein the user interface is configured to visually emphasize a display element by changing visual characteristics of the emphasized display element.

17. The information display unit of claim 16, wherein the user interface is configured to change one or more of the following visual characteristics of the emphasized display element: a position of the emphasized display element on the display, a size of the emphasized display element on the display, a color of the emphasized display element, a brightness of the emphasized display element, and a transparency of the emphasized display element.

18. The information display unit of claim 1, wherein the user interface is configured to visually emphasize a display element by changing visual characteristics of other display elements.

19. The information display unit of claim 18, wherein the user interface is configured to change one or more of the following visual characteristics of the other display elements: a position of the other display elements on the display, a size of the other display elements on the display, a color of the other display elements, a brightness of the other display elements, and a transparency of the other display elements.

20. The information display unit of claim 1, wherein the user interface is further configured to respond to detection of an object's proximity to the control element by visually emphasizing the second display element.

21. The information display unit of claim 1, wherein the control element associated with the second subsystem is switchable between being associated with the first subsystem and being associated with the second subsystem.

22. An automobile comprising:
a plurality of subsystems;
an information display unit comprising:
a display screen;
a user interface presented on the display screen, the user interface including
a first display element associated with a first subsystem of the automobile, and
a second display element displayed concurrently with the first display element, the second display element being associated with a second subsystem of the automobile,
a control element configured to control operation of the second subsystem; and
a proximity sensor configured to detect proximity of an object to the control element;
wherein the user interface is configured to respond to detection of an object's proximity to the control element by visually emphasizing the second display element.

23. The automobile of claim 22, wherein at least one of the display elements depicts information relating to a navigational subsystem of the automobile.

24. The automobile of claim 23, wherein the user interface is configured to visually emphasize a display element depicting information relating to the navigational subsystem of the automobile in response to the automobile approaching a turning maneuver determined by the navigational subsystem.

25. The automobile of claim 22, wherein the user interface is configured to visually emphasize the second display element in response to a user touching the control element.

26. The automobile of claim 22, wherein at least one of the display elements depicts information relating to an audio subsystem of the automobile.

27. The automobile of claim 22, wherein the user interface is configured to visually emphasize the second display element in response to detection of an object near the control element.

28. The automobile of claim 22, wherein the subsystems comprise one or more of the following: an audio system, a video system, a navigational system, a rear-view camera system, a fuel system, a telephone, and an instrumentation system.

29. The automobile of claim 22, wherein the user interface is configured to visually emphasize a display element by changing visual characteristics of the emphasized display element.

30. The automobile of claim 22, wherein the user interface is configured to visually emphasize a display element by changing visual characteristics of other display elements.

31. A method for displaying information about multiple subsystems of an automobile, the method comprising:
simultaneously presenting on an electronic display, at least two display elements, each depicting information relating to a different subsystem of the automobile;

associating a display element with a control element configured to control a subsystem of the automobile;

detecting an object proximate to the control element; and visually emphasizing at least one display element relative to at least one other display element in response to detecting the object.

32. The method of claim 31, wherein visually emphasizing a display element comprises changing visual characteristics of the emphasized display element.

33. The method of claim 31, wherein detecting the object comprises detecting a touching of the control element.

34. The method of claim 31, wherein visually emphasizing a display element comprises changing visual characteristics of a display element other than the emphasized display element.

35. The method of claim 31, wherein detecting the object comprises detecting an object in contact with the control element.

36. A medium bearing instructions to cause an instruction processor to:

simultaneously present, on an electronic display, at least two display elements, each depicting information relating to a different subsystem of an automobile;

associate a display element with a control element configured to control a subsystem of the automobile;

detect an object proximate to the control element; and visually emphasize at least one display element relative to at least one other display element in response to detecting the object.

37. The medium of claim 36, wherein the instructions that cause the instruction processor to detect and object comprise instructions for causing the instruction processor to detect a touching of the control element.

38. The medium of claim 36 wherein the instructions that cause the instruction processor to visually emphasize a display element comprise instructions that cause the instruction processor to change visual a characteristic of the emphasized display element.

39. The medium of claim 36, wherein the instructions that cause the instruction processor to visually emphasize a display element include instructions that cause the instruction processor to change a visual characteristic of a display element other than the emphasized display element.

* * * * *